Figure 1:
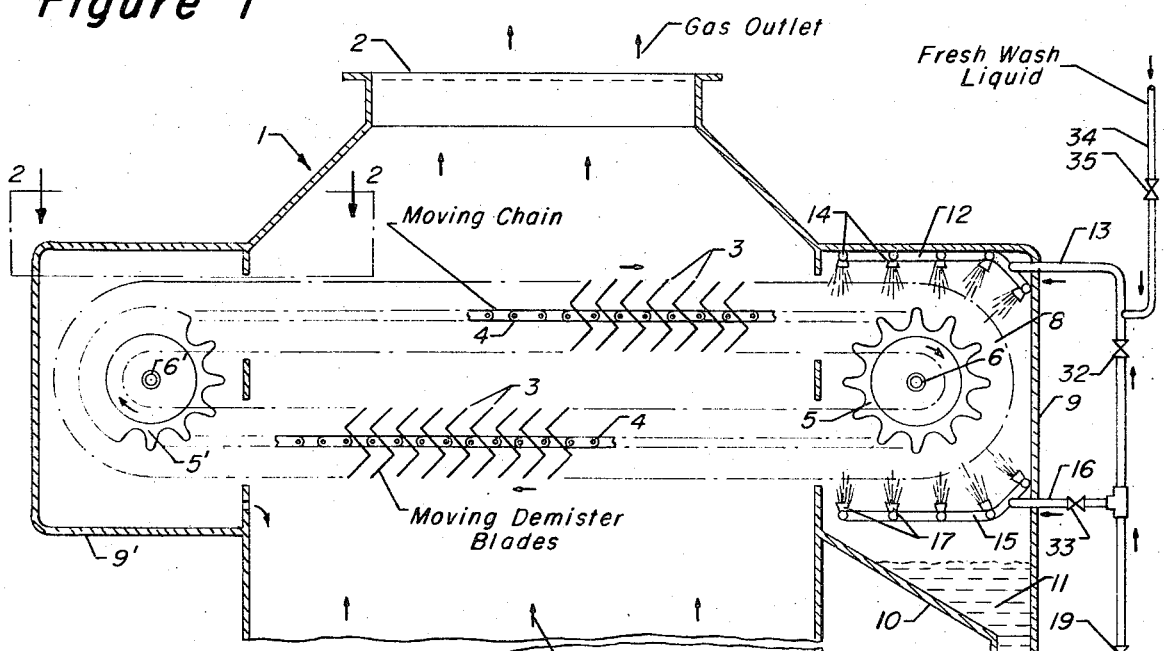
Figure 2:
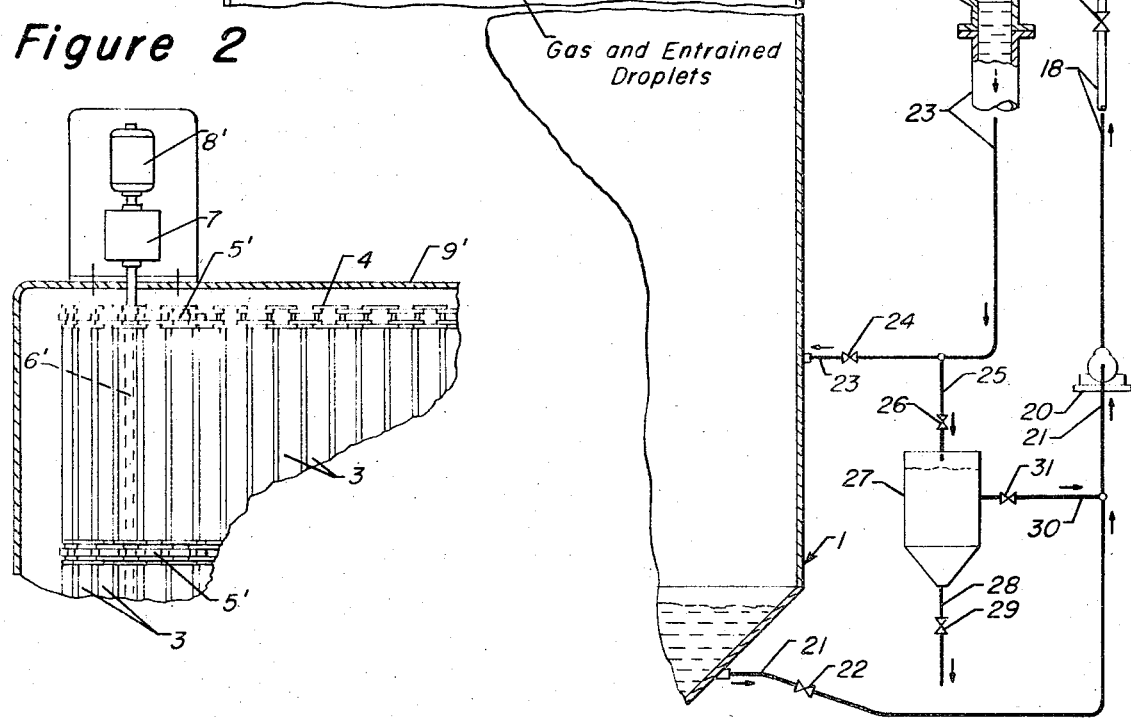

United States Patent [19]

Post

[11] 3,853,514
[45] Dec. 10, 1974

[54] MOVABLE DEMISTER SYSTEM
[75] Inventor: Willem Post, Redding, Conn.
[73] Assignee: Universal Oil Products Company, Des Plaines, Ill.
[22] Filed: July 30, 1973
[21] Appl. No.: 383,752

[52] U.S. Cl............... 55/242, 55/257, 55/290, 55/354, 55/440
[51] Int. Cl............................................ B01d 45/08
[58] Field of Search....... 55/96, 154, 228, 231, 232, 55/233, 234, 242, 243, 257, 259, 290, 354, 440, 443

[56] References Cited
UNITED STATES PATENTS
| | | | |
|---|---|---|---|
| 1,741,367 | 12/1929 | Irvin | 55/231 |
| 2,815,826 | 12/1957 | Young | 55/290 |
| 3,757,493 | 9/1973 | Johnston et al. | 55/259 |
| 3,768,234 | 10/1973 | Hardison | 55/91 |

FOREIGN PATENTS OR APPLICATIONS
| | | | |
|---|---|---|---|
| 235,214 | 8/1961 | Australia | 55/232 |
| 419,558 | 10/1925 | Germany | 55/232 |
| 565,067 | 10/1944 | Great Britain | 55/243 |
| 817,030 | 7/1959 | Great Britain | 55/290 |
| 846,749 | 8/1960 | Great Britain | 55/243 |
| 541,687 | 1/1932 | Germany | 55/96 |

Primary Examiner—Bernard Nozick
Attorney, Agent, or Firm—James R. Hoatson, Jr.; Philip T. Liggett; William H. Page, II

[57] ABSTRACT

Closely spaced demister blades are attached to a power operated chain means, or to some form of moving belt means, to provide for a continuous, or intermittent, transverse movement of the demister surfaces across the gas outlet portion of a gas scrubbing chamber. In addition, a demisting member cleaning section is provided to encompass a portion of the transversely moving demisting blades and contain therein a plurality of liquid spray nozzles that are spaced to impinge upon and clean the demister member surfaces as they pass through such section.

7 Claims, 4 Drawing Figures

PATENTED DEC 10 1974 3,853,514

MOVABLE DEMISTER SYSTEM

The present invention is directed to a movable demister blade system which will continuously, or intermittently, move the demisting members across the gas flow path of a scrubber chamber and into a blade cleaning section.

More particularly, the improved system provides for the attachment of the spaced demister members to power operated chains, or belt means, which can move the members transversely across the gas outlet portion of a gas scrubber and, in addition, can effect liquid spray cleaning of the demister surfaces as they pass through a cleaning section during their looping travel, or while in a back and forth movement.

In effecting the scrubbing of flue gas streams to remove sulfur dioxide ($SO_2$) as well as residual fly ash, there can be used to advantage lime, powdered limestone, or other scrubbing solutions. While such solutions are quite effective for the $SO_2$ removal by reason of absorption and chemical combination aspects, there is a problem of fine particulates and solids building up on surfaces of the demisting devices. The particulates or solids which carry along with the gas stream as well as become captured inside the small mist-like droplets from the main scrubbing portion of a gas contacting chamber may comprise various dissolved and undissolved solids, unreacted limestone, or a gypsum-like solids material caused by a limestone-$SO_2$ reaction, as well as some residual fly ash. In any event, it is highly desirable, and necessary, to have a demister system which incorporates means for eliminating or precluding the permanent deposition of particulates onto demister surfaces.

As to demisting materials and forms of construction, there are, of course, various types which may be used in combination with scrubbers, absorbers, or other chambers which accommodate gaseous streams. One type of mist eliminator means may embody layers of screening, mesh, chain, spheres, or other types of packings which can provide high surface area for capturing of entrained mist or droplets. However, dense "packing" types of materials are not satisfactory where there can be clogging from entrained particulates. As another type of mist eliminator means, there has been the use of staggered members or closely spaced "waveform" and "zig-zag" shaped plates which traverse a gas passageway to provide impingement surface area and a multiplicity of narrow, tortuous passageways. There closely spaced bent plate arrangements have frequently been referred to as "chevron" packing because of the angular, zig-zag configuration.

Although chevron plates or other impingement type members are preferred to layers of screen, or mesh, or to bulk packing, when being subjected to particulate containing streams, there can still be a problem with some depositions. In particular, there can be depositions on upstream face portions of the demister plates and a blockage of the narrow passage-ways between plates.

Thus, it may be considered a principal object of the present invention to provide for the continuous, or intermittent, movement of the demister members of a scrubber chamber into a cleaning zone so as to preclude any buildup of deposited material on the surface of the demister members.

In a further aspect, it is an object of the present invention to provide for the attachment of spaced demisting members to power operated continuous chain or looped belt means which will effect the movement of the transverse arrangement of spaced members across the gas outlet portion of scrubber tower and into a cleaning zone where pressurized liquid from suitably placed nozzles can, in turn, effect the cleaning of the surfaces of the individual demister members prior to their return to the demisting zone.

In one embodiment, the present invention provides a movable demisting system, including cleaning means for the continuous removal of any deposition of solid materials on the individual demisting members following their movement across the gas stream outlet portion of a gas stream contacting chamber, which comprises in combination, (a) a multiplicity of spaced apart and elongated demister members connected to movable carrier means to thereby form a movable arrangement of gas contacting demisting members, (b) said carrier means positioned within and across a demisting portion of the chamber in a manner to carry said members transversely across said chamber and across the path of the gas flow therethrough, (c) drive means connective to said carrier means, whereby the latter and said connecting demisting members can be caused to be moved across said chamber, and (d) a demisting member cleaning section with pressurized liquid spray means therein positioned to encompass the full lengths of a portion of the demisting members connecting with said carrier means, whereby a cleaning liquid will spray over the surfaces of each member after it has moved across the gas stream flow path in said chamber so as to wash off any solids buildup on said members.

In a preferred embodiment, the demisting members will connect with a continuous loop-form chain or belt form means which traverses the gas outlet flow path such that two layers of members will be provided within the demisting portion of the gas contacting chamber. A cleaning section for the demisting blades can be positioned to one side of the chamber and the continuous chain means will continuously or intermittently carry the multiplicity of spaced blades or other type impingement members through the cleaning zone to provide that a clean layer of blades will be caused to return to the gas flow path.

Where merely one layer of blades or demister members is provided to transverse the gas outlet path, there may be a moving belt or chain, or even a toothed-rack and gear arrangement, which will provide for the transverse movement of the multiplicity of demister members across the gas flow path. In other words, additional width within the scrubbing chamber or as an extension of the chamber can provide room for the transverse back and forth movement of the demister members from the gas flow path zone to one or more cleaning zones where there can be the continuous or intermittent cleaning of the demister surfaces.

Typically, the cleaning section of the system will make use of a plurality of spaced spray nozzle means such that the full length of each of the individual demisting members can be sprayed with a pressurized stream of a suitable liquid cleaning medium and permit substantially clean surface demister members to be returned to the demisting section of the scrubber chamber. Preferably, the spray nozzles will be located along the length or all of the demister members and at various angles both above and below the members such that optimum angles of fluid impingement will adequately clean all of the blade surfaces and remove any deposited materials. In a system where the demister members are attached to continuous loop carrying chains, the spaced chain members will normally engage sprocket wheels at each side portion of the chamber such that there is the transverse movement of members across the gas flow path and a resulting arrangement where demister members are moving in one direction in one layer while the members move in the opposing direction in the other layer of the loop arrangement. Also in this arrangement, it is generally advantageous to arrange the cleaning section of the system to encompass the end of the loop, or the zone above and below the sprocket wheel positioning, such that nozzle means can be operated both downwardly and upwardly onto the demister blade surfaces as they move around the sprocket wheel alignment with the moving continuous loop chain means and change direction by 180° from one layer to the next.

The spray liquid may comprise the same alkaline material that is used within the scrubber chamber as for example the calcium carbonate solution which may be used for the removal of $SO_2$ gases and residual fly ash in treating coal burning power plant units. On the other hand, the cleaning liquid may be a special solution which is collected and recirculated primarily within the cleaning section of the system, with the cleaning fluid containing a certain amount of detergent or other surfactant type of material which will enhance the removal of any fine particulates or any gypsum-like material from the blade surfaces. Generally, a single cleaning station will be sufficient in connection with the treatment of the demister member surfaces; however, where desired spray nozzles may be positioned at each side of a scrubber chamber such that the blade members are subjected to cleaning after each pass as they move continuously or intermittently across the demister section of the contact chamber in the two layer continuous belt arrangement.

It is not intended to limit the present invention to the use of any one type of demister member inasmuch as various forms of spaced impact members may be utilized to traverse the gas flow path and provide extended surface and tortuous path means whereby mist or fine droplets and entrained fine particulates can be collected from the outgoing gas stream. Spaced wave-form or zig-zag types of chevron blades, as heretofore described, have found rather wide usage as demister surfaces and such forms of spaced members may readily be utilized in the present system by bolting or otherwise effecting attachment to the chain, or other continuous loop belt carrier means, to in turn provide the continuously moving system of the present invention. The spaced chevron blades, or wave-form blades, can be made from metal, plastics, fiber glass, etc., and can also be subjected to high pressure spraying in order to remove deposited materials from their impact surfaces.

Reference to the accompanying drawing and the following description thereof will serve to illustrate one embodiment of the present invention where demister members are carried in a two directional manner across the flow path of a gas stream leaving a contact chamber and additionally illustrate the provision for effecting the cleaning of the demister member surfaces in a section maintained adjacent a side portion of the contact chamber. Variations in design and additional advantageous features which may be obtained in connection with the present form of continuous moving demister member system will also be noted hereinafter in connection with the following description of the drawing.

FIG. 1 of the drawing is a partial sectional elevational view indicating diagrammatically the attachment of demister members to continuous loop chain members such that they will traverse the gas outlet demister portion of a contact chamber.

FIG. 2 of the drawing is a partial sectional plan view of a portion of the demister section, as indicated by the line 2—2 in FIG. 1, indicating the use of motor driven sprocket wheel members to in turn drive the continuous chains carrying the attached demister members.

FIGS. 3 and 4 illustrate in partial sectional views how bent blade "chevron-form" spaced plates may be attached to the continuous chains or to a screen-type belt member for effecting movement transversely across a gas flow path.

Referring now particularly to FIG. 1 of the drawing, there is indicated diagrammatically the upper demister portion of a gas-liquid scrubbing tower, or other form of contact chamber 1, having a gas outlet section 2. spray nozzles or other means for introducing liquid into the chamber for the spraying and treating of the gaseous stream are not shown in the present drawing but will generally be placed below the demister section being illustrated in the present view. In this embodiment, there are provided a multiplicity of chevron-form demister blades 3 attached to movable chains 4 that in turn loop around and engage spaced sprocket wheel members 5 and 5' on spaced axles 6 and 6'. The chains 4 and the spaced sprockets 5 and 5' will, in turn, be spaced across the depth of the chamber 1 as may be required to structurally support the weight of the demister members 3 and provide for their transverse movement across the width of the gas contacting chamber. The blade members 3 will be spaced one from another to provide for optimum contacting of the gas stream flow and effect a desired demisting of the outgoing gaseous stream. Thus, the blades 3 will fully traverse the depth of the contact chamber by extending longitudinally between spaced chain members 4 as well as in a parallel relationship for the width between sprocket wheels 5 and 5' such that there will be no change for the gas stream to bypass the demister members, whether the latter are moving or stationary.

Reference to FIG. 2 of the drawing shows that the multiplicity of spaced demister members 3 will continue in longitudinal alignment such that members are available to fully traverse the entire gas flow passageway, with the chains and sprocket wheels being spaced one from another as may be required to effectively carry the demister blade in a non-sagging, fully supported arrangement. It will also be noted in connection with FIG. 2 of the drawing that one of the shaft members, such as 6', carrying sprocket wheels 5', will be connected to a gear box means 7 and motor means 8' in order that there may be provision for the power operation of the moving demister member system. For purposes of controlling the speed of the transverse system of blades, the power operating means will generally comprise a variable speed motor means 8' and/or the utilization of a variable speed gear box means 7 such that there may be full control of the movement of demister members to an optimum speed or optionally, to intermittent movement. It is to be recognized that the particle or solids buildup on demisting member surfaces can vary in different scrubbing or treating operations and that the rate of movement of blades into a cleaning section may require variation in accordance with the requirements of a particular installation. Typically, there will be no need to move the demisting members into contact with the cleaning spray nozzles at a rate greater than may be required to effect the removal of deposited material and maintain clean surfaces on the members.

Referring again to FIG. 1 of the drawing, it will be noted that there is provided a cleaning zone 8 within an additional housing section 9 extending along the side portion of chamber 1 and that this cleaning section 9 is, in turn, provided with a sloping wall lower portion 10 which serves as a liquid collecting zone 11. The interior of the cleaning section 9 is provided with upper header means 12 connecting with liquid supply piping 13 whereby a plurality of spaced nozzle means 14 can provide high pressure liquid impingement upon the surfaces of demister blades 3 as they pass through interior of cleaning zone 8 from one transverse path to the other path and as the individual blades are carried by chain means 4 around sprocket means 5. It will also be noted that the present embodiment provides for additional header means 15 connecting to liquid supply means 16 and the use of additional nozzles 17 which will provide a sufficient spray of cleaning liquid upwardly against and through the surfaces of the demister members 3 as they change direction around the sprocket wheels 5 to again move transversely across the gas flow path in the upper portion of the contact chamber 1. The positioning and the number of spray nozzles 14 and 17 indicated in the drawing are merely diagrammatic and, of course, not limiting to the present invention. The liquid being sprayed to the headers and nozzles by way of lines 13 and 16 may come by way of line 18 having valve means 19 and pump means 20 as well as line 21 with valve 22 which is connective with the lower portion of chamber 1, whereby the same liquid that is being utilized in the contact spraying of the gaseous stream can be utilized to effect the cleaning of demister member surfaces in zone 8 of section 9. Where spray chamber liquid is utilized, the collected liquid in zone 11 can be transferred by way of line 23 and valve 24 back into scrubber chamber 1 such that the cleaning liquid is saved within the system while removed particulates and solids from the surfaces of the demister members will be removed along with collected particulates from the scrubbing operation in chamber 1.

On the other hand, where a separate cleaning liquid system is desired, or required, then valve 24 will be closed and used cleaning fluid will pass by way of line 23 from collection zone 11 into line 25, having valve 26, so as to distribute the used liquid into a settling chamber 27 from which settled particulates, or other solid matter, may be removed by way of line 28 with valve 29. Clarified cleaning liquid will be withdrawn from chamber 27 by way of line 30 and valve 31 into line 21 connecting with pump 20 and then charged into line 18 such that recirculated liquid is then distributed through control valve means 32 and 33 into the respective upper and lower headers 12 and 15. The present embodiment also indicates the provision of adding fresh wash liquid by way of line 34 and valve 35 into line 18. Typically, the separate wash liquid system, with the collection-settling chamber, would be utilized where a detergent or other special cleaning liquid is utilized in zone 8 and there is a desired minimization of mixing with the wash liquid being utilized in chamber 1.

As hereinbefore noted, it is not intended to limit the present invention to the utilization of any one form of demister member, although chevron-type, closely spaced, blades have been indicated in the present drawing. Still further, it is not intended to limit the present invention to any one type of carrier means to effect the movement of demister blades across the chamber; however, normally link chain means will be utilized as the carrier means and such chain means will be sized and spaced as may be required to accommodate the demister members to a particular sized scrubber chamber.

Figure 3:
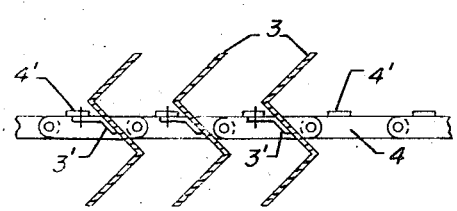

In FIG. 3 of the drawing, there is indicated diagrammatically the attachment of spaced chevron-type blades 3 onto lip members 4' of chain link members 4 through the use of suitable clip angle means 3' although other attachment means may well be utilized. The attachment of clip angle means 3' to blade members 3 and lip portions 4' may be accomplished by bolting, by suitable welding techniques, or by other desired manners. The method of attachment may, of course, vary in accordance with the type of demister member; in other words, as to whether or not such members are made of plastic, fiber glass, or of metal.

Figure 4:
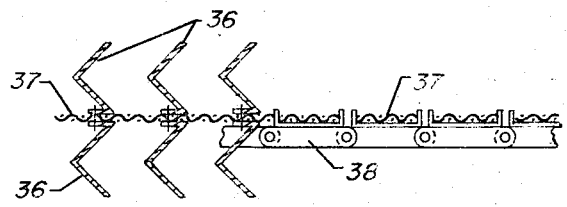

In FIG. 4 of the drawing, there is indicated diagrammatically the connection of blade means 36 to a screen belt means 37 which, in turn, is carried by moving chain means 38. This arrangement merely illustrates diagrammatically that there may be a combination of demister blade type members and demister screening or flexible grid means as a continuous loop-form belt arrangement which will carry the blade members transversely across a gas flow path and into a cleaning section of the moving demister blade system. Where a combination of blades and screening or flexible grid means is utilized, there will, of course, be accomplished the simultaneous cleaning of the blade surfaces and the screening elements as the combination of members is moved through a cleaning section of the system, such as is illustrated in FIG. 1 of the drawing.

It is to be realized that the present drawings and the foregoing descriptions are not to be considered limiting and that variations in design and construction may well be utilized within the scope of the present invention. For example, where deemed desirable, there may be a second cleaning section provided in the present moving demister blade system, with additional cleaning nozzles provided within a section 9' which encompasses the sprocket wheels 5' and on the opposite side of the chamber 1 with respect to section 9. The double cleaning station will, of course, provide that the demister members are cleaned after a single pass through the gas flow stream.

In still another alternative arrangement, there may well be an elongated cleaning section provided to one side of the contact chamber 1 whereby the demister members are cleaned while retained in a straight line arrangement, rather than being brought around sprocket wheels to effect a reversal in direction by 180°. In other words, in the straight line arrangement, the demister members will be moved in a back and forth manner by the chains or by a rack and gear means, rather than in a looping manner as provided by the continuous chain means or belt means.

In still another aspect, although the present drawings indicate that the gas flow is upwardly and outwardly from a vertically oriented gas contacting chamber, there can well be the vertical arrangement of demister members traversing a horizontal gas flow path in a horizontally oriented contacting chamber. In other words, the present invention need not be limited to having demister members move in horizontal paths across a vertically flowing gaseous stream.

I claim as my invention:

1. A movable demisting system, including cleaning means for the continuous removal of any deposition of solid materials on the individual demisting members following their movement across the gas stream outlet portion of a gas contacting chamber, said system comprising in combination,
    a. a movable carrier means, a multiplicity of spaced apart and elongated demisting members of chevron type comprising parallely positioned, spaced apart zig-zag-form plate-like members to provide impingement surfaces and tortuous paths for the gas stream passing through said chamber, said demisting members being connected to said movable carrier means to thereby form a movable arrangement of gas contacting demisting members,
    b. said carrier means being positioned within and across a demisting portion of said chamber in a manner to carry said demisting members transversely across said chamber and across the path of the gas flow therethrough,
    c. drive means connective to said carrier means, whereby the latter and said connecting demisting members can be caused to be moved across said chamber, and
    d. a demisting member cleaning section connected to said chamber and pressurized liquid spray means therein positioned to encompass the full lengths of a portion of the demisting members connecting with said carrier means, said cleaning section including a plurality of nozzle means as said liquid spray means to direct spray streams positioned both above and below said demisting members as said demisting members pass around sprocket wheel means of the drive means effecting a change in direction for said demisting members, said nozzle means being positioned to impinge upon the demister member surfaces as they effect a change in direction to again traverse the gas flow path through said chamber, whereby a cleaning liquid will spray over the surfaces of each member after it has moved across the gas stream flow path in said chamber so as to preclude a solids buildup on said members.

2. The movable demisting system of claim 1 further characterized in that the movable carrier means comprise continuous loop means providing that the demisting members will move in a two layer system with one layer spaced from the other and moving in an opposing direction.

3. The movable demisting system of claim 1 further characterized in that said movable carrier means comprise spaced link-form chain means carrying around spaced sprocket wheel means in turn positioned on axles at each side portion of said chamber.

4. The movable demisting system of claim 1 further characterized in that said movable carrier means is moved by variable speed power means, whereby there may be either intermittent or continuous movement of the carrier means at a selected variable speed.

5. The movable demisting system of claim 1 further characterized in that a flexible and gas permeable belt means is utilized in combination with bent plate members as said multiplicity of demisting members on said carrier means and the combination moves transversely in a two directional manner across the gas flow path in the demister portion of said chamber.

6. The movable demisting system of claim 1 further characterized in that piping means and liquid pumping means connect between the header means accommodating the liquid spray means in said cleaning section and a liquid collecting section of said contacting chamber, and, in addition, piping means is provided to connect between a lower liquid collecting portion of said cleaning section and the lower portion of said gas contacting chamber, whereby there may be recirculation of liquid between the lower portion of said chamber and said cleaning section.

7. The movable demisting system of claim 1 further characterized in that a separate cleaning liquid recirculation system is utilized for said cleaning section, with piping connecting the lower liquid collecting portion of said cleaning section with a settling chamber and additional piping provides for recirculating clarified liquid from such chamber to the spray means of the cleaning section whereby the major portion of the liquid for the cleaning section is maintained separate from the liquid being utilized in said chamber for contacting the gas flow stream therethrough.

* * * * *